US012560516B2

(12) United States Patent
Yao et al.

(10) Patent No.: US 12,560,516 B2
(45) Date of Patent: Feb. 24, 2026

(54) FRICTION TEST DEVICE BASED ON TORSIONAL HOPKINSON BAR (THB)

(71) Applicant: TIANJIN UNIVERSITY, Tianjin (CN)

(72) Inventors: Wei Yao, Tianjin (CN); Kaiwen Xia, Tianjin (CN); Bangbiao Wu, Tianjin (CN); Ying Xu, Tianjin (CN); Xing Li, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 370 days.

(21) Appl. No.: 18/144,145

(22) Filed: May 5, 2023

(65) Prior Publication Data

US 2023/0358656 A1 Nov. 9, 2023

(30) Foreign Application Priority Data

May 7, 2022 (CN) .......................... 202210490613.2

(51) Int. Cl.
*G01N 3/22* (2006.01)
*G01N 3/02* (2006.01)

(52) U.S. Cl.
CPC ................. *G01N 3/22* (2013.01); *G01N 3/02* (2013.01); *G01N 2203/0003* (2013.01); *G01N 2203/0021* (2013.01); *G01N 2203/0037* (2013.01); *G01N 2203/0048* (2013.01)

(58) Field of Classification Search
CPC .... G01N 3/02; G01N 3/22; G01N 2203/0003; G01N 2203/0021; G01N 2203/0037; G01N 2203/0048
See application file for complete search history.

(56) References Cited

U.S. PATENT DOCUMENTS 11,754,481 B2 * 9/2023 Fahem ..................... G01N 3/22
73/847

FOREIGN PATENT DOCUMENTS

| | | | | |
|---|---|---|---|---|
| CN | 104697854 A | 6/2015 | | |
| CN | 104729918 A | 6/2015 | | |
| CN | 111413216 A | 7/2020 | | |
| CN | 212568318 U | 2/2021 | | |
| CN | 114965117 A | * 8/2022 | ............... | G01N 3/26 |
| EP | 0410370 B1 | * 4/1992 | ............... | G01H 1/10 |
| GB | 2587397 A | 3/2021 | | |
| GB | 2587625 A | * 4/2021 | ............... | G01N 3/02 |

* cited by examiner

*Primary Examiner* — Jill E Culler
(74) *Attorney, Agent, or Firm* — Bayramoglu Law Offices LLC

(57) ABSTRACT

A friction test device based on a torsional Hopkinson bar (THB) includes a base, a baffle, and pull rods. The servo axial loading device includes a first oil pressure tank and a first pressure rod. One end of the first pressure rod is embedded in the first oil pressure tank. The baffle includes a front baffle and a rear baffle. The pull rods are arranged between the front baffle and the rear baffle. A loading guide rod is provided between the front baffle and the rear baffle. The rear baffle is fixed thereon with a constraint mass. The loading guide rod includes one end connected to the first pressure rod and the other end connected to the constraint mass through a specimen. The friction test device further includes a torque application device and a torque storage device. Therefore, the specimen undergoes a full friction process from static to dynamic.

8 Claims, 5 Drawing Sheets

FRICTION TEST DEVICE BASED ON TORSIONAL HOPKINSON BAR (THB)

CROSS REFERENCE TO THE RELATED APPLICATIONS

This application is based upon and claims priority to Chinese Patent Application No. 202210490613.2, filed on May 7, 2022, the entire contents of which are incorporated herein by reference.

TECHNICAL FIELD

The present disclosure relates to the technical field of dynamic friction properties of materials, and in particular to a friction test device based on a torsional Hopkinson bar (THB).

BACKGROUND

A torsional Hopkinson bar (THB) is an optimal device for studying the dynamic shear properties of materials, which can greatly improve the accuracy of test data and improve test efficiency. Since the 1970s, various types of loading methods have emerged, such as energy pre-stored loading, explosive loading, flywheel loading, and electromagnetic loading. These types of loading methods have their own advantages and disadvantages. The energy pre-stored loading has a simple principle, but requires a large number of consumables. The explosive loading can achieve a high loading rate, but has high test requirements and a low success rate. The flywheel loading is only suitable for a test environment with a medium-to-low loading rate. The electromagnetic loading can accurately control the generation time of the torsional wave, but the electromagnetic signal has an impact on the test. These loading methods are designed to rapidly apply a dynamic load to a material contact surface and generate high-speed friction and sliding of the material, so as to test the mechanical properties of the material during dynamic shear, and study the influence of an external disturbance load on the material contact surface. In actual natural environments, friction-related damage caused by a material, a structure, or a geological disaster is usually driven by a weak force and suddenly occurs when exceeding a critical point. The formation mechanism of such damage is clearly inconsistent with the action mechanism of the above loading methods. However, there is no study about a high-speed friction test device suitable for spontaneous damage. The high-speed friction test device and traditional test devices differ in that there is a long development period before damage occurs. The study of this development period has direct guiding significance for natural disaster prediction.

SUMMARY

In order to solve the problems in the prior art, an objective of the present disclosure is to provide a friction test device based on a torsional Hopkinson bar (THB).

To solve the above technical problems, the present disclosure adopts the following technical solution.

The friction test device based on a THB includes a base, where the base is provided with a servo axial loading device, a baffle, and pull rods; the servo axial loading device includes a first oil pressure tank and a first pressure rod; one end of the first pressure rod is embedded in the first oil pressure tank; the baffle includes a front baffle and a rear baffle; the front baffle and the rear baffle are fixed on the base; the pull rods are arranged between the front baffle and the rear baffle; a loading guide rod is provided between the front baffle and the rear baffle; the front baffle is fixed thereon with the first oil pressure tank, and the rear baffle is fixed thereon with a constraint mass; and the loading guide rod includes one end connected to the first pressure rod and the other end connected to the constraint mass through a specimen; and the friction test device further includes a torque application device and a torque storage device; the torque application device is configured to apply torque to the loading guide rod; and the torque storage device is configured to store the torque applied by the torque application device.

Further, an energy unloading structure is provided between the servo axial loading device and an end surface of the loading guide rod; the energy unloading structure includes a bearing and two flywheels; the bearing is located between the two flywheels; and the two flywheels are in contact with the loading guide rod and the first pressure rod, respectively.

Further, the base is further provided thereon with a support seat; a top of the support seat is provided with a guide rod hole; and the loading guide rod runs through the guide rod hole.

Further, the friction test device further includes a data acquisition system; the data acquisition system includes a strain gauge, a bridge box, a strain amplifier, and an oscilloscope; the strain gauge is bonded to the loading guide rod for measuring a torsional wave signal, and is connected to the bridge box through a wire; and the bridge box is connected to the strain amplifier and the oscilloscope through a wire.

Further, the loading guide rod includes a solid section and a hollow section; the solid section and the hollow section are connected through a circular sleeve; the circular sleeve is provided with the positioning pin for fixing the loading guide rod; and the solid section is located at one side of the loading guide rod connected to the servo axial loading device, while the hollow section is located at the other side of the loading guide rod.

Further, the torque application device includes a limit plate, a gear rack, a gear, and a sleeve; the base is provided thereon with a fixed seat; the limit plate is provided at a top of the fixed seat; the gear rack is provided at a side wall of the fixed seat; the gear rack is meshed with the gear; the gear is fixedly connected to the sleeve; the gear and the sleeve are sleeved on an outer side of the loading guide rod; the loading guide rod is fixedly connected to the sleeve through a positioning pin; and the torque application device is driven by a second oil pressure tank.

Further, the second oil pressure tank is provided on the base, and is provided therein with a second pressure rod; and the second pressure rod is connected to the gear rack.

Further, the torque storage device includes a third oil pressure tank, a clamp plate, and a fixed plate; the fixed plate is provided at a top of the clamp plate; the third oil pressure tank is provided on the base, and is provided therein with a third pressure rod; the clamp plate includes a fixed clamp plate and a movable clamp plate; the fixed clamp plate is fixedly provided on the base; a bottom of the movable clamp plate is provided with a castor; the castor is provided on the base; a side of the fixed clamp plate away from the movable clamp plate is provided with a fixed bracket; a side of the movable clamp plate away from the fixed clamp plate is connected to the third pressure rod; opposite sides of the fixed clamp plate and the movable clamp plate are respectively provided with two semicircular openings that form a circular hole; the loading guide rod runs through the circular hole; an edge of the circular hole is provided with a locking element; and an inner side of the locking element is provided with strip teeth.

Further, the constraint mass is disc-shaped; the constraint mass is in contact with a hollow section of the loading guide rod through the specimen; and the constraint mass has a diameter eight times an outer diameter of the loading guide rod.

Further, there are four pull rods, all of which are threaded rods; and the four threaded rods are connected to the front baffle and the rear baffle through nuts, and are symmetrically arranged in pairs at two sides of the loading guide rod.

Compared with the prior art, the friction test device provided by the present disclosure has the following beneficial effects:

In the present disclosure, an axial pressure and torque are sequentially applied to the loading guide rod connected to the constraint mass through the specimen. When the maximum static friction force between the specimen and the constraint mass is exceeded, the specimen and the constraint mass undergo relative sliding, causing the specimen to undergo a full friction process from static to dynamic, and generating a torsional wave. The data acquisition system records the torsional wave generated during the full friction process (relative friction behavior before and after sliding), and implements inversion and analysis from static to dynamic based on the torsional wave so as to study the full friction process between a material and a rock fault under a complex stress condition. In addition, the present disclosure can also conduct the high-speed friction test with another loading mode, in which a dynamic torsional wave is generated and transmitted to a contact surface of the specimen to study the high-speed friction behavior of the specimen. The present disclosure can study the dynamic friction property with two different loading modes, which has great convenience and saves a lot of time for researchers in related fields. The present disclosure also provides a new research method. Further, the present disclosure is provided with the torque storage device for storing the torque applied by the torque application device.

Figure 1:
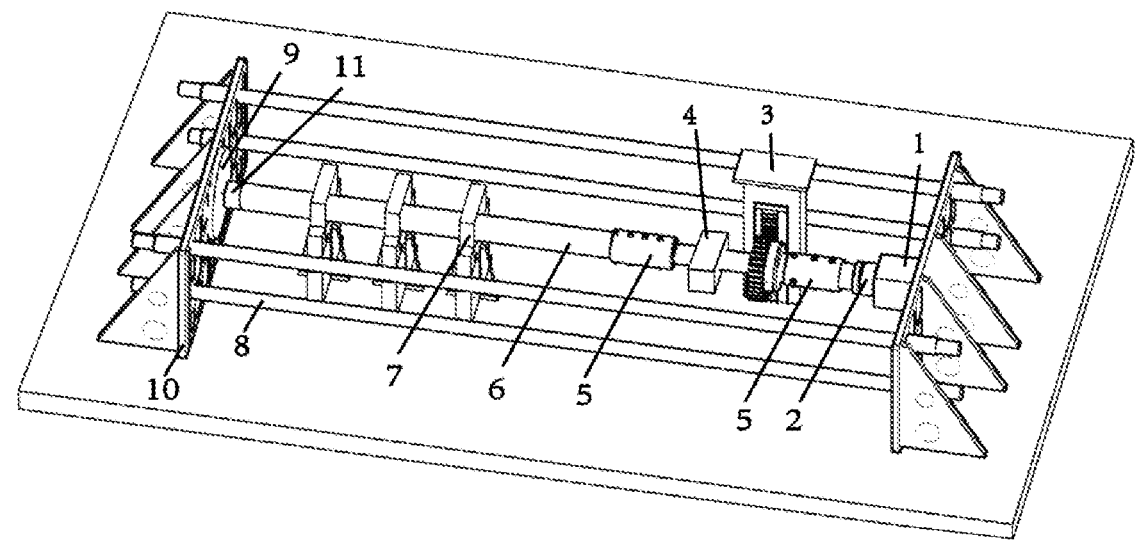
FIG. 1 is a full structural view of a friction test device based on a torsional Hopkinson bar (THB) according to the present disclosure.

REFERENCE NUMERALS 1. servo axial loading device; 2. energy unloading structure; 21. flywheel; 22. bearing; 23. ball; 3. torque application device; 31. gear rack; 32. gear; 33. second oil pressure tank; 4. torque storage device; 41. third oil pressure tank; 42. fixed plate; 43. fixed clamp plate; 44. movable clamp plate; 45. castor; 46. fixed bracket; 47. locking element; 5. sleeve; 51. positioning pin; 6.

loading guide rod; 7. support seat; 8. pull rod; 9. constraint mass; 10. baffle; and 11. specimen.

DETAILED DESCRIPTION OF THE EMBODIMENTS

The technical solutions of the present disclosure will be further described below with reference to the drawings and embodiments.

Figure 2:
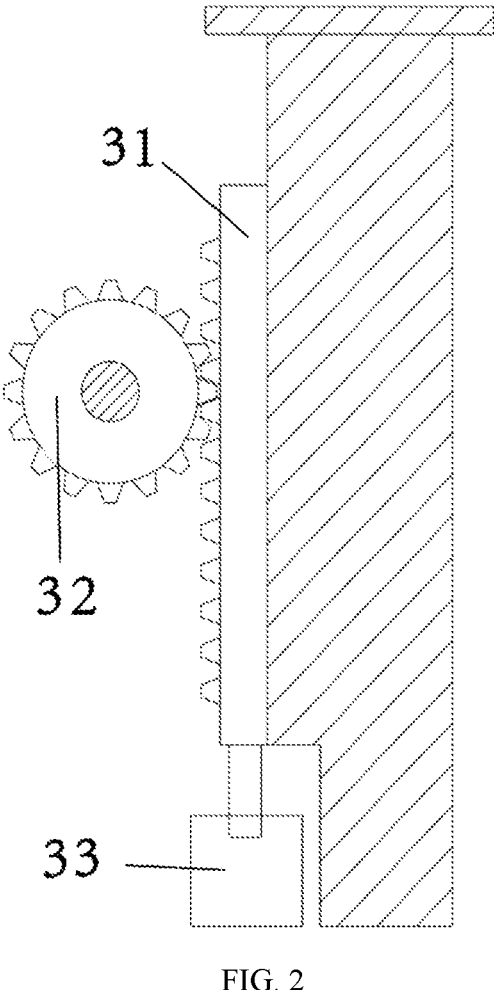
FIG. 2 is a side view of a torque application device.
Figure 3:
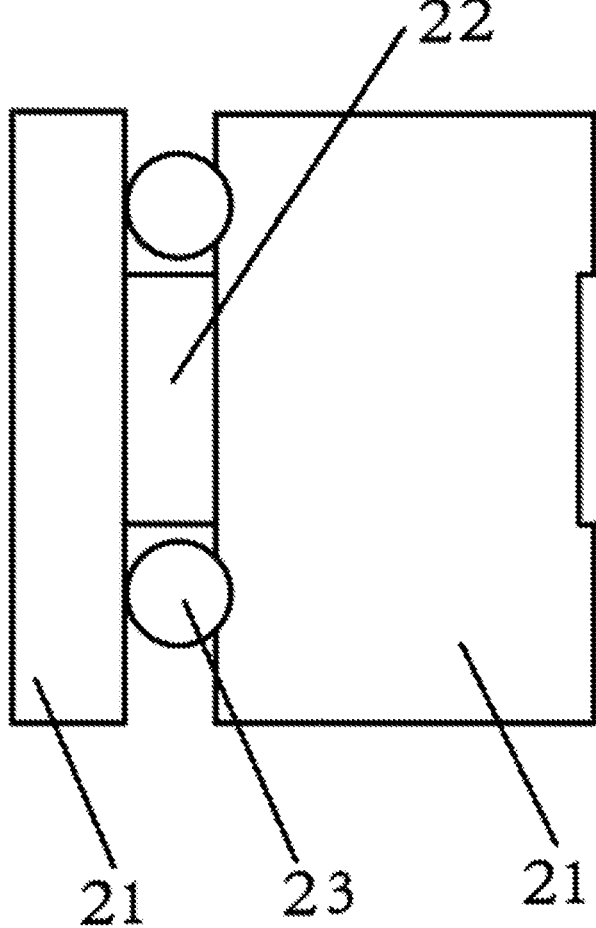
FIG. 3 is a structural diagram of an energy unloading structure.
Figure 4:
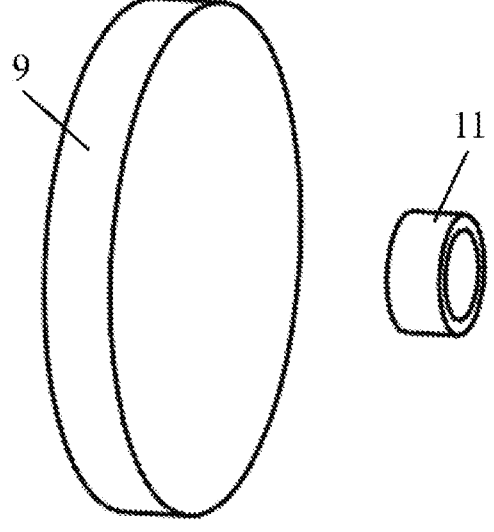
FIG. 4 is a structural diagram of a constraint mass and a specimen.
Figure 5:
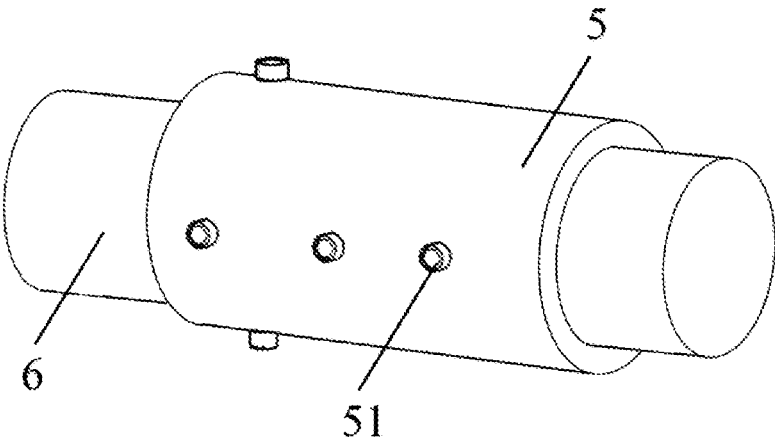
FIG. 5 is a structural diagram of a sleeve.
Figure 6:
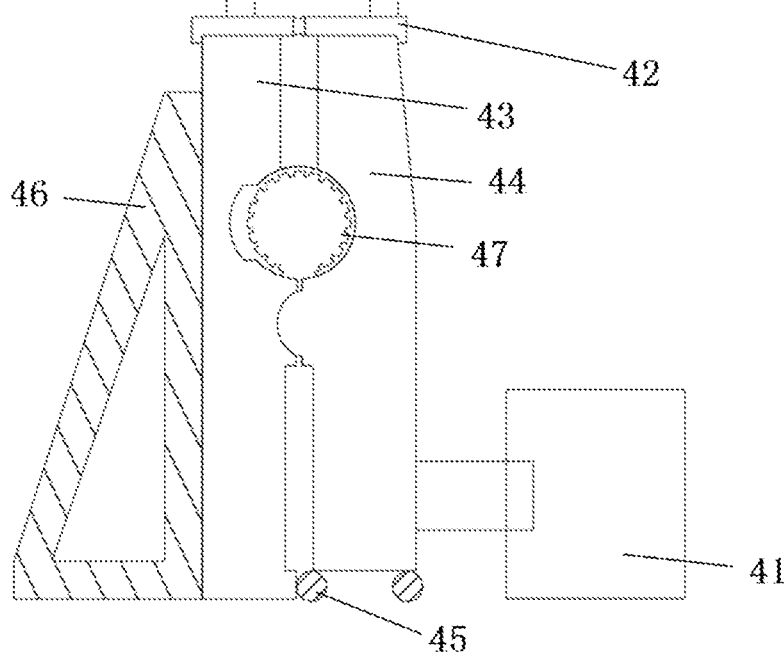
FIG. 6 is a structural diagram of a torque storage device.

The present disclosure provides a friction test device based on a torsional Hopkinson bar (THB). As shown in FIGS. 1 to 6, the friction test device includes a base. The base is provided with servo axial loading device 1, baffle 10, and pull rods 8. The servo axial loading device 1 includes a first oil pressure tank and a first pressure rod. One end of the first pressure rod is embedded in the first oil pressure tank. The baffle 10 includes a front baffle and a rear baffle. The front baffle and the rear baffle are fixed on the base. The pull rods 8 are arranged between the front baffle and the rear baffle. Loading guide rod 6 is provided between the front baffle and the rear baffle. The front baffle is fixed thereon with the first oil pressure tank, and the rear baffle is fixed thereon with constraint mass 9. The loading guide rod 6 includes one end connected to the first pressure rod and the other end connected to the constraint mass 9 through specimen 11. The servo axial loading device 1 is configured to accurately control an axial pressure at the one end of the loading guide rod 6 so as to change an oil pressure in the first oil pressure tank, thus adjusting front-back extension of the first pressure rod to achieve axial pressure adjustment.

The friction test device further includes torque application device 3 and torque storage device 4. The torque application device 3 is configured to apply torque to the loading guide rod 6, and the torque storage device 4 is configured to store the torque applied by the torque application device 3.

The pull rods 8 are arranged between the front baffle and the rear baffle, and are fixed by nuts. There are four pull rods 8, all of which are threaded rods. The four threaded rods are connected to the front baffle and the rear baffle through the nuts, and are symmetrically arranged in pairs at two sides of the loading guide rod 6. When the servo axial loading device 1 applies the axial pressure to the loading guide rod 6, the pull rods 8 improve the stability of the entire system.

The base is further provided thereon with the torque application device 3 for applying the torque to the loading guide rod 6. The torque application device 3 includes a limit plate, gear rack 31, gear 32, and sleeve 5. The base is provided thereon with a fixed seat, and the limit plate is provided at a top of the fixed seat. The gear rack 31 is provided at a side wall of the fixed seat, and the gear rack 31 is meshed with the gear 32. The gear 32 is fixedly connected to the sleeve 5. The gear 32 and the sleeve 5 are sleeved on an outer side of the loading guide rod 6. The loading guide rod 6 is fixedly connected to the sleeve 5 through positioning pin 51. The torque application device 3 is driven by second oil pressure tank 33. The second oil pressure tank 33 is provided on the base, and the second oil pressure tank 33 is provided therein with a second pressure rod. The second pressure rod is connected to the gear rack 31.

The change in the oil pressure inside the second oil pressure tank 33 is controlled to adjust the front-back extension of the second pressure rod, such that the gear rack 31 is moved up and down. Due to the meshing transmission between the gear rack 31 and the gear 32, the gear 32 is rotated. The gear 32 is connected to the sleeve 5, thus driving the sleeve 5 to rotate. When the sleeve 5 is rotated, the torque is applied to the loading guide rod 6. The gear 32 has an adjustable rotation rate for easy control, ensuring the safety and efficiency of torque application. The limit plate is located above the gear rack 31 to limit the position of the gear rack 31 so as to prevent excessive torque application. When the axial pressure is applied to the two ends of the loading guide rod 6, the sleeve 5 begins to rotate to apply the torque to the loading guide rod 6.

The base is further provided with the torque storage device 4. The torque storage device includes third oil pressure tank 41, a clamp plate, and fixed plate 42. The fixed plate 42 is provided at a top of the clamp plate. The third oil pressure tank 41 is provided on the base, and the third oil pressure tank 41 is provided therein with a third pressure rod. The clamp plate includes fixed clamp plate 43 and movable clamp plate 44. The fixed clamp plate 43 is fixedly provided on the base. A bottom of the movable clamp plate 44 is provided with castors 45. The castors 45 are provided on the base. A side of the fixed clamp plate 43 away from the movable clamp plate 44 is provided with fixed bracket 46. A side of the movable clamp plate 44 away from the fixed clamp plate 43 is connected to the third pressure rod. Opposite sides of the fixed clamp plate 43 and the movable clamp plate 44 are respectively provided with two semicircular openings that form a circular hole. The loading guide rod 6 runs through the circular hole. An edge of the circular hole is provided with locking element 47. An inner side of the locking element 47 is provided with strip teeth. The locking element 47 located at the edge of the circular hole is in a circular ring shape with a notch, and is provided with the strip teeth at the inner side. The locking element can lock the loading guide rod 6 under the pressure of the clamp plate. There are four castors 46 arranged at the bottom of the movable clamp plate 44 to reduce friction. The castors 46 support the movable clamp plate to rotate with a small angle, so as to break the fixed plate 42.

Preferably, energy unloading structure 2 is provided between the servo axial loading device 3 and an end surface of the loading guide rod 6. The energy unloading structure 2 includes bearing 22 and two flywheels 21. The bearing 22 is located between the two flywheels 21. The two flywheels 21 are located at two sides, and are in contact with the loading guide rod 6 and the first pressure rod, respectively.

Energy is stored at one side of the sleeve 5, i.e. one side of the constraint mass 9, and is released at the other side through the energy unloading structure 2. Through the energy unloading structure 2, the servo axial loading device 1 can only transmit the axial pressure. When the flywheels 21 are rotated, balls 23 are driven to rotate to consume energy of a torsional wave or torque, thus protecting the servo axial loading device 1. The energy unloading structure 2 is provided at one end of the loading guide rod 6. Thus, when the loading guide rod 6 is subjected to the axial pressure and torque, one part of the loading guide rod 6 is in a free state (without storing energy), while the other part stores energy.

Preferably, support seats 7 are further provided on the base. A top of each of the support seats 7 is provided with a guide rod hole, and the loading guide rod 6 runs through the guide rod hole. The support seats 7 play a role of supporting and fixing the loading guide rod 6. In this embodiment, there are three support seats 7.

Preferably, a data acquisition system is further provided. The data acquisition system includes strain gauges, a bridge box, a strain amplifier, and an oscilloscope. The strain gauges are bonded to the loading guide rod 6 for measuring a torsional wave signal, and are connected to the bridge box through a wire. The bridge box is connected to the strain amplifier and the oscilloscope through a wire.

Preferably, the loading guide rod 6 includes a solid section and a hollow section. The solid section and the hollow section are connected through a circular sleeve. The circular sleeve is provided with the positioning pin 51 for fixing the loading guide rod 6. The solid section is located at one side of the loading guide rod 6 connected to the servo axial loading device 1, while the hollow section is located at the other side of the loading guide rod, which facilitates the study of a high-speed friction process.

Preferably, the constraint mass 9 is disc-shaped. The constraint mass 9 is in contact with the hollow section of the loading guide rod 6 through the specimen 11. The constraint mass 9 serves as a support device, and has a diameter eight times an outer diameter of the loading guide rod 6 to provide a large moment of inertia.

In this embodiment, the application of the axial pressure and torque is controlled through the same oil pressure system. The oil pressure system controls the pressures in the first oil pressure tank and the second oil pressure tank respectively, achieving independent loading of the axial pressure and torque. During a test, the axial pressure is first applied, followed by the torque.

A test process includes the following steps.

Spontaneous Dynamic Friction Test

Step 1. The Data Acquisition System is Installed.

The strain gauges are bonded to the loading guide rod 6. A single strain gauge is at an angle of 45° with an axial direction of the loading guide rod 6, which is convenient for measuring the torsional wave signal. In order to improve the measurement accuracy, the strain gauges are bonded to upper and lower sides of the same position of the loading guide rod 6. The bridge box is connected through the wire, and then the strain amplifier and the oscilloscope are connected. After the strain gauges are bonded, it takes 1-2 days for air-drying so as to make the strain gauges well coupled with the pulse signal.

Step 2. The Specimen 11 is Provided.

The specimen 11 is circular and has the same cross-sectional size as the loading guide rod 6. The specimen is bonded to an end surface of the hollow section of the loading guide rod 6. When the specimen 11 and the loading guide rod 6 are completely fixed together, the test can be started.

Step 3. The Data Acquisition System is Started.

After the installation of the data acquisition system is completed, it is powered on to check whether the data acquisition system can work properly and whether there is an interference signal. If there is a strong interference signal, an attempt is made to eliminate an interference source. Once everything is normal, a subsequent operation can begin.

Step 4. An Axial Pressure is Loaded.

The nuts at two ends of each of the pull rods 8 are tightened to prevent the pull rods from moving back and forth between the front baffle 10 and the rear baffle, thus enhancing the stability of the device. A motor switch is turned on, and a required axial pressure value is set through an operation panel. At this point, the oil pressure control system applies pressure to the first oil pressure tank through a pipe. The pressure is transmitted to the loading guide rod 6 through the first pressure rod, such that specimen 11 is in close contact with the constraint mass 9. When the target value is reached, the application is stopped.

Step 5. Torque is Applied.

The torque is applied to the loading guide rod 6 through the torque application device 3. The oil pressure control system applies the pressure to the second oil pressure tank through a pipe. The second pressure rod is moved upwards, driving the gear rack 31 to move upwards. When an oil pressure decreases, the gear rack 31 is moved downward due to its own weight. During the upward movement of the gear rack 31, one side of the loading guide rod 6 is limited by friction between the constraint mass 9 and the specimen 11, resulting in a torsion. The other side of the loading guide rod is provided with the energy unloading structure 2, so the other side of the loading guide rod 6 is in a free state. When the torque applied is beyond a static friction limit between the constraint mass 9 and the specimen 11, the specimen 11 slides relative to the constraint mass 9, generating a torsional wave signal. The torque application is stopped immediately after relative sliding occurs.

Step 6. Data are Acquired and Analyzed.

After the pulse wave is generated at the specimen 11, it is acquired by the strain gauges on the loading guide rod 6 and displayed on the oscilloscope through the strain amplifier. The pulse signal is stored in an instrument, and a test result is copied to a computer through a data cable for analysis. The test data is analyzed to study a stress state of a friction surface before relative sliding and changes in a sliding rate, a friction force, and a friction coefficient during sliding. In this way, the mechanical behavior evolution of the specimen 11 during the full friction process before and after applying the torque is derived, so as to invert the behaviors of various materials before instability under different stress environments.

Induced Dynamic Friction Test

Steps 1 to 4 above are repeated.

Step 5. The Torque Storage Device 4 is Adjusted.

The fixed plate is provided, and the third oil pressure tank 41 is controlled to drive the third pressure rod to act on the movable clamp plate 44, thus causing the locking element 47 to lock the loading guide rod 6.

Step 6. Torque is Applied and Released.

The torque is applied to the loading guide rod 6 by the torque application device 3. The oil pressure control system applies the pressure to the second oil pressure tank 33 through a pipe. The second pressure rod is moved upwards, driving the gear rack 31 to move upwards. When the oil pressure decreases, the gear rack 31 is moved downwards due to its own weight. Due to the design of the torque storage device 4, a process of torque release is involved. In this device, there are two methods to release the torque. In a first method, the third pressure rod acts on the movable clamp plate 44. When the torque applied to the energy storage section of the loading guide rod 6 increases, a tensile force borne by the fixed plate 42 changes accordingly. When a maximum tensile strength is exceeded, the fixed plate 42 is broken, and the locking element 47 cannot lock the loading guide rod 6, thus releasing the torque. In a second method, the tensile strength of the fixed plate 42 is sufficiently large. When the torque applied reaches a desired value, the oil pressure of the third oil pressure tank 41 is quickly released, and a lower part of the movable clamp plate 44 is disengaged from the limit of the third pressure rod and is pulled outwards. Furthermore, the locking element 47 releases the loading guide rod 6 to release the stored energy, thus generating a torsional wave.

Step 7. Data are Acquired and Analyzed.

After a pulse wave is generated at the torque storage device 4, the pulse wave is acquired by the strain gauges on the loading guide rod 6. Then reflection and transmission occur at a contact interface of specimen 11, and a reflected wave is acquired by the loading guide rod 6. In this way, the strain gauges acquire the information of the incident and reflected waves. The acquired information is displayed on the oscilloscope through the strain amplifier, and the pulse signal is stored in an instrument. A test result is copied to a computer through a data cable for analysis. The test data is analyzed to study a stress state of the friction surface before relative sliding and changes in a sliding rate, a friction force, and a friction coefficient during sliding. In this way, the mechanical behavior evolution of the specimen 11 during a full friction process before and after applying the torque is derived, so as to invert the behavior of various materials before instability under different stress environments.

After all the above operations are completed, the servo axial loading device 1 is adjusted to relieve the pressure until the pressure value of the first oil pressure tank is zero. The torque application device 3 of servo control is adjusted until zero pressure. The gear rack 31 returns to its initial position due to its own weight. The specimen 11 is recovered for subsequent research and analysis of the friction surface.

The above described are merely preferred embodiments of the present disclosure and are not intended to limit the present disclosure in any form. Any simple changes, equivalent variations and modifications made to the above embodiments based on the technical essence of the present disclosure should fall within the scope defined by the technical solutions of the present disclosure.

What is claimed is:

1. A friction test device based on a torsional Hopkinson bar (THB), comprising a base, wherein the base is provided with a servo axial loading device, a baffle, and pull rods; the servo axial loading device comprises a first oil pressure tank and a first pressure rod; one end of the first pressure rod is embedded in the first oil pressure tank; the baffle comprises a front baffle and a rear baffle; the front baffle and the rear baffle are fixed on the base; the pull rods are arranged between the front baffle and the rear baffle; a loading guide rod is provided between the front baffle and the rear baffle; the first oil pressure tank is fixed on the front baffle; a constraint mass is fixed on the rear baffle; and the loading guide rod comprises a first end connected to the first pressure rod and a second end connected to the constraint mass through a specimen;

the friction test device further comprises a torque application device and a torque storage device; the torque application device is configured to apply torque to the loading guide rod; and the torque storage device is configured to store the torque applied by the torque application device;

the torque application device comprises a limit plate, a gear rack, a gear, and a sleeve; a fixed seat is provided on the base; the limit plate is provided at a top of the fixed seat; the gear rack is provided at a side wall of the fixed seat; the gear rack meshes with the gear; the gear is fixedly connected to the sleeve; the gear and the sleeve are sleeved on an outer side of the loading guide rod; the loading guide rod is fixedly connected to the sleeve through a positioning pin; and the torque application device is driven by a second oil pressure tank; and the torque storage device comprises a third oil pressure tank, a clamp plate, and a fixed plate; the fixed plate is provided at a top of the clamp plate; the third oil pressure tank is provided on the base; a third pressure rod is provided in the third oil pressure tank; the clamp plate comprises a fixed clamp plate and a movable clamp plate; the fixed clamp plate is fixedly provided on the base; a bottom of the movable clamp plate is provided with a castor; the castor is provided on the base; a side of the fixed clamp plate away from the movable clamp plate is provided with a fixed bracket; a side of the movable clamp plate away from the fixed clamp plate is connected to the third pressure rod; opposite sides of the fixed clamp plate and the movable clamp plate are respectively provided with two semicircular openings; the two semicircular openings form a circular hole; the loading guide rod runs through the circular hole; an edge of the circular hole is provided with a locking element; and an inner side of the locking element is provided with strip teeth.

2. The friction test device according to claim 1, wherein an energy unloading structure is provided between the servo axial loading device and an end surface of the loading guide rod; the energy unloading structure comprises a bearing and two flywheels; the bearing is located between the two flywheels; and the two flywheels are in contact with the loading guide rod and the first pressure rod, respectively.

3. The friction test device according to claim 1, wherein the base is further provided with a support seat; a guide rod hole is provided at a top of the support seat; and the loading guide rod runs through the guide rod hole.

4. The friction test device according to claim 1, further comprising a data acquisition system, wherein the data acquisition system comprises a strain gauge, a bridge box, a strain amplifier, and an oscilloscope; the strain gauge is bonded to the loading guide rod for measuring a torsional wave signal; the strain gauge is connected to the bridge box through a first wire; and the bridge box is connected to the strain amplifier and the oscilloscope through a second wire.

5. The friction test device according to claim 1, wherein the loading guide rod comprises a solid section and a hollow section; the solid section and the hollow section are connected through a circular sleeve; the circular sleeve is provided with the positioning pin for fixing the loading guide rod; and the solid section is located at a first side of the loading guide rod connected to the servo axial loading device, and the hollow section is located at a second side of the loading guide rod.

6. The friction test device according to claim 1, wherein the second oil pressure tank is provided on the base; a second pressure rod is provided in the second oil pressure tank; and the second pressure rod is connected to the gear rack.

7. The friction test device according to claim 5, wherein the constraint mass is disc-shaped; the constraint mass is in contact with the hollow section of the loading guide rod through the specimen; and the constraint mass has a diameter eight times an outer diameter of the loading guide rod.

8. The friction test device according to claim 1, wherein the pull rods include four threaded rods; the four threaded rods are connected to the front baffle and the rear baffle through nuts; and the four threaded rods are symmetrically arranged in pairs at two sides of the loading guide rod.

* * * * *